United States Patent
Wataya et al.

(10) Patent No.: US 6,916,534 B2
(45) Date of Patent: Jul. 12, 2005

(54) THERMAL SPRAY SPHERICAL PARTICLES, AND SPRAYED COMPONENTS

(75) Inventors: Kazuhiro Wataya, Takefu (JP); Takao Maeda, Takefu (JP); Toshihiko Tsukatani, Takefu (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 97 days.

(21) Appl. No.: 10/092,503

(22) Filed: Mar. 8, 2002

(65) Prior Publication Data
US 2002/0160189 A1 Oct. 31, 2002

(30) Foreign Application Priority Data
Mar. 8, 2001 (JP) .................................. 2001-064725
Apr. 6, 2001 (JP) .................................. 2001-109182

(51) Int. Cl.$^7$ .................. B32B 15/02; B32B 19/00; C01F 17/00; C04B 35/50
(52) U.S. Cl. ................ 428/402; 428/357; 501/152; 423/263
(58) Field of Search ................ 428/357, 402, 428/323, 328, 701, 702, 404, 688; 501/152; 423/263; 106/286.1, 287.18

(56) References Cited

U.S. PATENT DOCUMENTS

| | | | |
|---|---|---|---|
| 3,864,093 A | 2/1975 | Wolfla .......................... | 29/195 |
| 4,578,114 A | 3/1986 | Rangaswamy et al. ....... | 75/252 |
| 5,061,560 A | * 10/1991 | Tajima et al. ............... | 428/357 |
| 6,576,354 B2 | * 6/2003 | Tsukatani et al. ........... | 428/702 |
| 2002/0015853 A1 | 2/2002 | Wataya et al. | |

FOREIGN PATENT DOCUMENTS

| | | |
|---|---|---|
| EP | 1 167 565 A | 1/2002 |
| JP | 08-119632 * | 5/1996 |

OTHER PUBLICATIONS http://www.chemicalelements.com/groups/rareearth.html.*

* cited by examiner

Primary Examiner—Sheeba Ahmed
(74) Attorney, Agent, or Firm—Birch, Stewart, Kolasch & Birch, LLP

(57) ABSTRACT

Spherical particles of a rare earth (inclusive of yttrium)-containing compound and having a breaking strength of 10–300 MPa and an average particle diameter of 10–80 μm are suitable for plasma spraying.

15 Claims, No Drawings

THERMAL SPRAY SPHERICAL PARTICLES, AND SPRAYED COMPONENTS

This invention relates to thermal spray spherical particles of rare earth-containing compound useful for thermal spraying on ceramics or a metal, and a sprayed component.

BACKGROUND OF THE INVENTION

From the past, plasma spraying and detonation spraying techniques have been widely utilized for forming dense spray coatings on surfaces of ceramic or a metal. In these thermal spraying techniques, metal, metal oxide and the like are often used as the spray powder.

More particularly, it is a common practice in the art to thermally spray metal or metal oxide particles onto metal or ceramic substrates to form a coating thereon for imparting heat resistance, abrasion resistance and corrosion resistance. The properties of the coating thus formed depend on the spraying conditions as well as the properties of powder particles to be sprayed.

The particle powders suitable for thermal spray coatings typically include (1) a fused and ground powder obtained by melting a starting material in an electric furnace, cooling the melt for solidification, and pulverizing the solid in a grinding machine into particles, followed by classification for particle size adjustment; (2) a sintered and ground powder obtained by firing a raw material, and pulverizing the sintered material in a grinding machine into particles, followed by classification for particle size adjustment; and (3) a granulated powder obtained by adding a raw material powder to an organic binder to form a slurry, atomizing the slurry through a spray drying granulator, and firing the particles, optionally followed by classification for particle size adjustment. The starting material used in the preparation of these powders (1) to (3) is selected as appropriate and has been developed in accordance with the cost and the desired properties of the end spray coating.

While plasma processes are involved in the recent semiconductor fabrication art, rare earth-containing compounds have been developed as a wafer processing component in corrosive halide gases because they have high resistance to plasma.

When spray coatings are applied to components in semiconductor manufacturing apparatus, the spray coatings are required (a) to contain less impurity elements other than the predominant constituents and (b) to have a less irregular, smooth surface bearing less fines, which means to suppress dusting during wafer processing. To meet these requirements, it becomes crucial how to control the properties of powder particles to be sprayed as well as the spraying conditions.

The thermal spray particles have to meet the requirements that (i) they can be consistently fed without disintegration at a quantitative rate to the plasma or flame during spraying, (ii) they are fully melted during spraying (in plasma or flame) and (iii) they are highly pure. These requirements are quantitatively expressed by more than ten physical parameters and elemental analysis data of particles.

Since the thermal spray particles are fed to the spray gun through a narrow flowpath such as a transportation tube, whether they can be consistently fed at a quantitative rate is largely affected by the flow thereof among other physical parameters. However, the fused or sintered and ground powder resulting from method (1) or (2) has irregular shapes which lead to the drawback that the sprayed coating has large irregularities. Additionally, the fused and ground powder has the other drawback that the content of impurities other than the constituent elements is high, and the sintered and ground powder has the other drawback that impurities are often introduced in the grinding step.

Developed as a solution to these problems of the ground powders was the granulated powder obtained by method (3), that is, having the advantage of smooth flow due to the spherical or nearly spherical shape of particles. An additional advantage of the granulated powder is that a relatively pure granulated powder can be readily prepared by reducing impurities in the starting material.

However, a starting powder of a certain type can give rise to the problems that particles of a shape dissimilar to sphere are granulated therefrom and that the starting powder sticks to granulated particles. An additional problem is that a degradation of flow is incurred particularly when particles have a small diameter.

When a coating is sprayed using the granulated powder, the fines which have not been granulated (i.e., have been carried from the starting powder) are incorporated in the coating or stick to the surface of the coating. This causes a substantial amount of dust to generate when the coated component is used in semiconductor equipment or the like.

In order that particles of metal compound be thermally sprayed, without dust generation, to form a coating having improved bond strength, the particles must be completely melted in the flame or plasma during the spraying step and the supply of the feed particles must be precisely controlled. Particularly when particles of rare earth-containing compounds are used for thermal spraying, because of their high melting point, they should preferably have a smaller average particle size so that they may be completely melted.

In the event where granulated powder is prepared using a spray drying granulator, however, it is difficult to selectively prepare a fraction of particles having a small average particle size. Inevitably, particles having a relatively large average particle size are concomitantly produced. Such particles with a large average particle size have a large weight and are not completely melted when fed into the plasma flame so that they are incorporated in the sprayed coating as unmelted particles, which become one cause of incurring irregularities in the coating.

One approach for overcoming the above-mentioned problems is to reduce the particle size of the starting material for eventually holding down coating surface irregularities. This approach is undesirably accompanied by generation of fines, a degradation of flow and a difficulty of precise metering. As a result, surface irregularities develop and the coating becomes less dense. Furthermore, the fines which stick to particle surfaces without being granulated are not introduced into the plasma flame during the spraying step and are thus kept unmelted so that they are incorporated in or stick to the sprayed coating.

SUMMARY OF THE INVENTION

A first object of the invention is to provide thermal spray spherical particles which have a sufficient breaking strength to remain uncollapsed in the flame or plasma during spraying.

A second object of the invention is to provide thermal spray, high purity particles of rare earth-containing compound which can be thermally sprayed to form a smooth, dense coating despite the high melting point or the rare earth-containing compound, and without generation of fines.

A third object of the invention is to provide a smooth sprayed component having the particles spray coated on a substrate surface without concomitant sticking of fines.

In a first embodiment, the invention provides spherical particles for thermal spraying, consisting essentially of a rare earth (inclusive of yttrium)-containing compound and having a breaking strength of at least 10 MPa and an average particle diameter of 10 to 80 μm, preferably 15 to 80 μm. Most often, the rare earth-containing compound is a rare earth oxide, and more preferably the rare earth oxide is yttrium oxide or ytterbium oxide.

Thermal spraying spherical particles consisting essentially of a rare earth (inclusive of yttrium)-containing compound having a breaking strength of at least 10 MPa and an average particle diameter of 10 to 80 μm are prepared by granulating rare earth (inclusive of yttrium)-containing compound (especially rare earth oxide) fines having a Fisher diameter of up to 0.6 μm, or a yttrium or lanthanide-containing compound having an average particle diameter of 0.01 to 5 μm, into granules.

The thermal spray particles of rare earth-containing compound having a specific breaking strength and average particle diameter according to the first embodiment of the present invention do not collapse in the spraying flame or plasma and thus form a coating in which no unmelted fragments are incorporated or to which surface no unmelted fragments stick. Especially, by processing a starting oxide powder under predetermined conditions, thermal spray particles having the desired physical properties are produced.

In a second embodiment, the invention provides spherical particles for thermal spraying, consisting essentially of a rare earth-containing compound and having a bulk density of at least 1.0 g/cm$^3$, an aspect ratio of up to 2, and a cumulative volume of pores with a radius of up to 1 μm which is less than 0.5 cm$^3$/g.

The spherical particles have a particle size distribution in which a particle diameter D90, D50 and D10 corresponds to 90 vol %, 50 vol % and 10 vol % accumulation, respectively. Preferably D90 is up to 100 μm, more preferably up to 50 μm, and the ratio of D50 to a Fisher diameter is up to 5. Also preferably, D10 is at least 5 μm, more preferably at least 10 μm, and a dispersion index is up to 0.6.

In a further embodiment, the invention provides a thermally sprayed component comprising a substrate having a surface and a coating of the rare earth-containing compound particles thermally sprayed to the substrate surface.

In the thermal spray particles of rare earth-containing compound according to the second embodiment of the present invention, their bulk density, cumulative pore volume and aspect ratio are controlled to the predetermined ranges, their shape is made spherical, and optionally, their particle size distribution is controlled to be sharp. Then the particles generate few or no fines, remain free flowing, have a high density and high strength, and completely melt upon thermal spraying rather than collapsing. A coating obtained by thermally spraying the particles has the advantages of no dust deposition, smoothness, high purity, improved bond, and corrosion resistance, as compared with prior art sprayed coatings.

DESCRIPTION OF THE PREFERRED EMBODIMENTS

First Embodiment

In the first embodiment of the invention, spherical particles for thermal spraying are formed of a rare earth (inclusive of yttrium)-containing compound and have a breaking strength of at least 10 MPa and an average particle diameter of 10 to 80 μm.

As used herein, the "breaking strength" St is determined from the following equation using as parameters a particle diameter (d in mm) and a compression load (P) measured by a micro-compression testing instrument Model MCTM-500 (by Shimadzu Corp.).

$$St = 2.8P/\pi d^2$$

As used herein, the "average particle diameter" is a diameter D50 corresponding to 50% by volume accumulation in a particle size distribution as measured by a laser diffraction analyzer. Fisher diameter is as measured by a Fisher subsieve sizer.

As used herein, the term "rare earth" encompasses rare earth elements of Group 3A in the Periodic Table inclusive of yttrium (Y), that is, preferably Y, Eu, Gd, Tb, Dy, Ho, Er, Tm, Yb, Lu, etc. The thermal spray spherical particles of the invention are formed of a rare earth-containing compound selected from the compounds of rare earth elements of Group 3A inclusive of yttrium (Y). The "rare earth-containing compound" includes oxides, halides (fluorides, oxyfluorides, chlorides, etc.) and other compounds which contain rare earth elements. Especially, rare earth oxides are preferred. Of these oxides, yttrium oxide and ytterbium oxide are more preferred. It is understood that compound oxides of the rare earth combined with at least one metal selected from Al, Si, Zr, In, etc. are also useful for the inventive particles.

If the breaking strength St of thermal spray spherical particles is less than 10 MPa, the particles will collapse into fines in the flame or plasma during the spraying step. The upper limit of breaking strength is, though not critical, usually up to 300 MPa.

If the average particle diameter of thermal spray spherical particles is less than 10 μm, some particles may gasify during the spraying step, resulting in a reduced yield. If the average particle diameter is more than 80 μm, some particles may remain unmelted during the spraying step. The preferred average particle diameter is from 10 to 60 μm, more preferably from 15 to 60 μm.

Of the thermal spraying spherical particles, the spherical particles of rare earth-containing compound are prepared by granulating rare earth-containing compound fines having a Fisher diameter of up to 0.6 μm into granules, and firing the granules at a temperature of 1,200 to 1,800° C., preferably at 1,500 to 1,800° C.

If the Fisher diameter of rare earth-containing compound fines is more than 0.6 μm, the sintering of granules in the firing step is retarded, failing to produce spherical particles with a satisfactory breaking strength. With an improvement in breaking strength taken into account, the preferred Fisher diameter is 0.4 μm or less.

For granulation, any well-known technique may be employed. For example, granulation is carried out using a slurry of fines having a Fisher diameter of up to 0.6 μm in a suitable solvent. The solvent used to form the slurry is not critical and may be selected from alcohols such as isopropanol, water and other solvents.

The resulting granules may have an appropriate size, and preferably an average particle diameter of 10 to 80 μm, especially 10 to 60 μm because particles suited for thermal spraying are obtainable therefrom at the end of firing.

According to the inventive method, the firing step is carried out in an atmosphere of air, an inert gas or vacuum, using an electric furnace or the like. The firing temperature is 1,200 to 1,800° C., more preferably 1,500 to 1,800° C. when the rare earth oxide is used as the raw material. A firing temperature above the upper limit (1,800° C.) might cause substantial fusion of particles, failing to obtain spherical particles.

More specifically, the thermal spray spherical particles are prepared by the procedure to be described below.

First, a slurry is prepared by adding a solvent such as water to a fine powder of rare earth-containing compound having a Fisher diameter of up to 0.6 μm. Granules are then formed from the slurry using a granulator such as a tumbling granulator (i.e., rotary disk granulator), spray granulator, compression granulator or fluidized bed granulator. A granular powder having an average particle diameter of 10 to 80 μm is obtained.

By way of precaution for preventing the granules from being broken during collection or other operation, an organic material which will be burnt out in the firing step may be blended in the raw material oxide prior to granulation. Examples of the organic material include polyvinyl alcohol (PVA), carboxymethyl cellulose (CMC), polyvinyl pyrrolidone (PVP), methyl cellulose (MC), hydroxypropyl cellulose (HPC), polyethylene glycol, phenolic resins, and epoxy resins. The amount of the organic material added is not critical as long as it gives rise to no problem in the firing step. Usually, the organic material is added in an amount of 0.1 to 5% by weight based on the rare earth-containing compound fine powder.

In the granulation step by a granulator, more or less non-spherical granules form. Since such non-spherical granules can cause to reduce the flow of powder, it is recommended to separate the granulated powder into non-spherical granules and spherical granules by means of a classifier, and to deliver only the spherical granule fraction to the firing step.

The thus granulated powder is placed in a refractory container and loaded in an electric furnace or the like in which it is fired in an atmosphere of air, an inert gas or vacuum at a temperature of 1,200–1,800° C. for 5 min to 10 hr, preferably 1 hr to 5 hr.

The firing step yields spherical particles which are ready for use in thermal spraying. In the particles as fired, however, some fusion bonds between particles are usually found. If the particles in this partially fused state are exposed to high-temperature plasma, melting is insufficient on the coarse particle side, resulting in less adhesion to the substrate. It is thus recommended to feed the particles as fired to a disintegrator, pulverizer or classifier (such as sieve), whereby fused particles are separated into discrete monodisperse particles that are thermal spray spherical particles with an average particle diameter of 10 to 80 μm.

The thermal spray spherical particles obtained by the above procedure have a sufficiently high breaking strength of at least 10 MPa to withstand rupture during the spraying step. Using the particles for thermal spraying, there is obtained a sprayed coating in a sound state that unmelted fines are not incorporated in the coating or do not stick to the coating surface.

Second Embodiment

In the second embodiment of the invention, spherical particles for thermal spraying are formed of a rare earth-containing compound and have a bulk density of at least 1.0 g/cm$^3$, an aspect ratio of up to 2, and a cumulative volume of pores with a radius of up to 1 μm which is less than 0.5 cm$^3$/g.

As used herein, the "rare earth-containing compound" includes oxides, halides (fluorides, oxyfluorides and chlorides, etc.) and other compounds which contain rare earth elements. Of these, the oxides are preferred because they are vulnerable to sintering. In the following description, reference is made to oxide although the same discussion applies to other rare earth-containing compounds. Where the particles are of oxides, they preferably have a breaking strength of from 10 MPa to 300 MPa as in the first embodiment. The rare earth-containing oxide is selected from the oxides of rare earth elements of Group 3A inclusive of yttrium (Y) as in the first embodiment. Use is preferably made of a heavy rare earth-containing oxide that is an oxide containing at least one rare earth element selected from Y, Eu, Gd, Tb, Dy, Ho, Er, Tm, Yb and Lu. It is understood that compound oxides of the rare earth-containing oxide combined with at least one metal selected from Al, Si, Zr, In, etc. are also useful.

If the bulk density is less than 1.0 g/cm$^3$, particles are less dense and hence, rather weak, with a risk of collapsing upon spraying. The preferred bulk density is 1.2 to 5.0 g/cm$^3$.

If the cumulative pore volume is 0.5 cm$^3$/g or more, particles become more irregular on their surface, that is, smooth particles are not obtainable. In order that particles maintain relatively good fluidity even when their particle diameter is reduced, the cumulative volume of pores with a radius of up to 1 μm should be less than 0.5 cm$^3$/g. Preferably the cumulative volume of pores with a radius of up to 1 μm is 0.3 cm$^3$/g or less because the particles are better flowing. The pore radius and the cumulative pore volume can be measured by Mercury Porosity-metry.

The thermal spray particles of rare earth-containing compound according to the invention are spherical in shape. Namely, the particles have an aspect ratio of up to 2. As used herein, the "aspect ratio" is defined as the ratio of major diameter to minor diameter of a particle, that is an index indicating whether the particle shape is approximate to sphere. An aspect ratio of more than 2 indicates that particles have an irregular, needle, flaky or other shape dissimilar from sphere, leading to disturbed flow. The lower limit of the aspect ratio is, though not critical, preferably close to 1. The term "spherical" as used herein means the shape of particles having an aspect ratio of up to 2 and thus embraces true spherical to generally spherical shapes.

In the second embodiment of the invention, the particles have a particle size distribution in which a particle diameter D90, D50 and D10 corresponds to 90 vol %, 50 vol % and 10 vol % accumulation, respectively. In a preferred embodiment, D90 is up to 50 μm and the ratio of D50 to a Fisher diameter is up to 5.

If the particle diameter D90 exceeds 100 μm, there is a risk that particles are not completely melted in the plasma flame and thus form non-fused particles, and irregularities occur on the coating surface.

If the ratio of D50/Fisher diameter exceeds 5, there are contained more fractions of coarse particles and fines, which preclude precise feed at a constant rate. If the ratio of D50/Fisher diameter is up to 5, preferably between 1 and 3, the powder is judged to contain less fractions of coarse particles and fines. As pores open at particle surfaces become smaller, the ratio of D50/Fisher diameter becomes smaller, which enables constant feed. Even when the particle diameter is further reduced, precise feed at a constant rate is possible. As a consequence, using the thermal spray particles in this preferred embodiment, a smooth, dense sprayed coating can be formed.

As previously defined, Fisher diameter is as measured by a Fisher subsieve sizer. More specifically, the Fisher diameter is calculated from a difference in gas pressure across a powder bed through which gas passes, and thus dependent on the average particle diameter and particle size distribution of the powder and the surface state of particles. Then, in the case of a large average particle diameter, a sharp particle size distribution and/or a smooth particle surface, the Fisher diameter is calculated to be relatively large. Accordingly, when the ratio of D50/Fisher diameter is calculated, a lower ratio suggests a sharper particle size distribution or a smoother particle surface. Particularly, at the same particle size distribution, particles with a lower D50/Fisher diameter ratio are judged to have a smoother surface.

In a further preferred embodiment, D10 is at least 5 μm, and the particles having a dispersion index of up to 0.6. This setting leads to suppressed generation of fines, a sharp particle size distribution, and improved particle flow, and precludes clogging of a nozzle through which the powder is fed. It is noted that the dispersion index is defined as:

Dispersion index=(D90−D10)/(D90+D10).

The particles are further improved in flow when they are controlled so as to have a dispersion index of 0.1 to 0.5 and an angle of repose of up to 44°.

In a still further preferred embodiment, the thermal spray particles of rare earth-containing compound have a specific surface area of up to 2.0 m$^2$/g, and more preferably 0.1 to 1.5 m$^2$/g. A surface area in excess of 2.0 m$^2$/g invites a likelihood that particles become collapsible, causing dust generation.

When it is desired that a coating formed on a component by spraying the particles be of high purity and free of colored spots, and impart satisfactory corrosion resistance to the coated component. The thermal spray particles of rare earth-containing compound should preferably have a limited impurity content. First, the content of each of iron group elements (Fe, Ni, Co, etc.), alkali metal elements (Na, K, etc.) and alkaline earth metal elements (Mg, Ca, etc.) in the particles should preferably be up to 5 ppm, calculated as oxide. The lower the content of these metal elements, the better are the results. In most cases, the lower limit is about 0.1 ppm. It is noted that the content of iron group elements, alkali metal elements or alkaline earth metal elements is measured by inductively coupled plasma (ICP) emission spectrometry after acidolysis of the particles.

Secondly, the content of carbon in the thermal spray particles should preferably be up to 100 ppm. A limited carbon content below 100 ppm prevents the bond between particles in the sprayed coating from being weakened by residual carbon, and hence, precludes dust generation. This indicates that even when granules are formed from a starting powder material using a binder, they are preferably fired so as to minimize the residual carbon, thereby preventing formation of carbide with the starting material.

For polycrystalline particles, it is believed that they are more dense as single crystal grains constituting each particle have a larger grain size. The single crystal grains constituting each particle are generally known as crystallites. In the thermal spray particles of rare earth-containing compound according to the invention, the crystallites preferably have a size of at least 25 nm, and more preferably at least 50 nm. When the crystallite size is less than 25 nm, polycrystalline particles with such a small single crystal grain size are not regarded dense in many cases. Note that the crystallite size is determined by effecting x-ray diffraction analysis and calculating according to Wilson method. According to Wilson method, the crystallite size is normalized to fall in the range of 0 to 100 nm, regardless of the actual size of single crystal grains.

The thermal spray particles of rare earth-containing oxide are prepared, for example, by the procedure to be described below.

First, a slurry is prepared by adding fines of rare earth-containing compound, especially rare earth-containing oxide having a Fisher diameter of up to 0.6 μm and an average particle diameter (primary particle) of 0.01 to 5 μm, preferably 0.01 to 1 μm to a medium such as water or alcohol along with a binder. Granulation from the slurry is then carried out using a granulator such as a tumbling granulator, spray granulator, compression granulator or fluidized bed granulator. The granules are dried and fired in air or inert gas atmosphere or under vacuum at 1,200 to 1,800° C., preferably 1,500 to 1,800° C. for 5 min to 10 hr, preferably 1 hr to 5 hr, yielding free flowing particles having a particle diameter D90 of up to 100 μm, a D50/Fisher diameter ratio of up to 5, a bulk density of at least 1.0 g/cm$^3$, a cumulative pore volume of less than 0.5 cm$^3$/g, an aspect ratio of up to 2, and a generally spherical shape.

Examples of the binder include polyvinyl alcohol (PVA), celluloses such as carboxymethyl cellulose (CMC), hydroxypropyl cellulose (HPC) and methyl cellulose (MC), polyvinyl pyrrolidone (PVP), polyethylene glycol (PEG), polytetrafluoroethylene (PTFE), phenolic resins, and epoxy resins. Usually, the binder is added in an amount of 0.1 to 5% by weight based on the rare earth-containing compound.

The thermal spray particles of rare earth-containing compound are generally spherical and relatively small in shape, contain a minimal amount of fines, and have less irregular, smooth surfaces. The particles are thus smoothly flowing and ensure precise metering to a spray nozzle without causing clogging thereof. As a result, a coating obtained by spraying the particles is smooth, dense and substantially free of sticking fines.

In a further embodiment, the invention provides a thermally sprayed component comprising a substrate and a coating of the rare earth-containing compound particles thermally sprayed to a surface of the substrate.

The material of the substrate is usually selected from metals, alloys, ceramics and glass, though not limited thereto. Examples include Al, Ni, Cr, Zn, Zr, Si and alloys, oxides, nitrides and carbides thereof such as alumina, aluminum nitride, silicon nitride, silicon carbide, quartz glass, and zirconia.

The coating on the substrate surface preferably has a thickness of 50 to 500 μm, more preferably 150 to 300 μm. A coating thickness of less than 50 μm leads to a likelihood that the sprayed component, on use as a corrosion resistant component, must be replaced by a new one just after faint corrosion. A coating of more than 500 μm thick is too thick and has a risk that delamination occurs within it.

The coating preferably has a surface roughness of up to 60 μm, more preferably up to 40 μm. A surface roughness of more than 60 μm might have a risk of dusting during the service of the sprayed component and presents a larger plasma contact area which may degrade corrosion resistance and allow fines to generate with the progress of corrosion. Namely, a coating having a surface roughness of up to 60 μm ensures good corrosion resistance and minimizes the sticking of fines to the coating surface. It is then effective for precluding corrosion even in a corrosive gas atmosphere as typified by halide gas plasma. Then the sprayed component is advantageously used as a corrosion resistant component. Since the spray particles of rare earth-containing compound are used, the sprayed component is minimized in dusting as demonstrated by a population of sticking non-fused particles on the coating surface being up to 10 particles/100 μm$^2$.

The spray coated component of the invention is obtainable by plasma or vacuum spraying the rare earth-containing compound particles to the substrate surface to form a coating thereon. The plasma gas used herein is usually selected from nitrogen/hydrogen, argon/hydrogen, argon/helium and argon/nitrogen, though not limited thereto. The spraying conditions are not critical and may be determined as appropriate in accordance with the type of substrate and rare earth-containing compound particles used and the desired application of the spray coated component.

In the spray coated component, the coating should preferably have a limited content of iron group elements, alkali metal elements and alkaline earth metal elements which is each up to 5 ppm, calculated as oxide. This level is accomplished using spray particles of rare earth-containing compound having a limited metal element content of up to 5 ppm as described above. Differently stated, when coating is formed using spray particles of rare earth-containing compound having iron group elements, alkali metal elements and alkaline earth metal elements introduced each at a content of more than 5 ppm, the iron group elements, alkali metal elements and alkaline earth metal elements are incorporated in the coating in the same content as in the starting spray particles, which might exert detrimental effects on wafers when the spray coated component is used in semiconductor equipment.

As mentioned above, the sprayed component of the invention bears a smooth, dense coating having a surface roughness of up to 60 μm and a high purity as demonstrated by a limited content of iron group elements, alkali metal elements and alkaline earth metal elements which is each 5 ppm or less, calculated as oxide. Then the sprayed component can be used in equipment where a high purity is crucial, because the sprayed component generates less fines or dust during plasma etching so that the introduction of impurities into wafers being processed is minimized. More specifically, the sprayed component is best suited for use in liquid crystal manufacturing equipment and semiconductor manufacturing equipment, to name a few.

EXAMPLE

Examples of the invention are given below by way of illustration and not by way of limitation.

Example 1

10 g of methyl cellulose was added to 5 kg of yttrium oxide having a Fisher diameter of 0.45 μm, to which deionized water was added to give an approximately 40 wt % aqueous slurry. The aqueous slurry was sprayed by a spray dryer, forming granules having an average particle diameter of about 50 μm.

The granule powder was fired in an electric furnace having an air atmosphere at 1,600° C. for 2 hours and cooled. The thus obtained powder was passed through a sieve with an opening of 150 μm, obtaining a thermal spray powder of spherical particles having an average particle diameter of 50 μm. The particles had a breaking strength of about 13 MPa, when measured using a planar indenter at a testing load of 980 mN and a load applying rate of about 41.5 mN/sec.

Example 2

Thermal spray spherical particles having an average particle diameter of 50 μm were prepared as in Example 1 except that yttrium oxide having a Fisher diameter of 0.28 μm was used. The particles were measured to have a breaking strength of about 160 MPa.

Example 3

Thermal spray spherical particles having an average particle diameter of 49 μm were prepared as in Example 1 except that yttrium oxide having a Fisher diameter of 0.35 μm was used. The particles were measured to have a breaking strength of about 130 MPa.

Example 4

Thermal spray spherical particles having an average particle diameter of 50 μm were prepared as in Example 1 except that ytterbium oxide having a Fisher diameter of 0.28 μm was used. The particles were measured to have a breaking strength of about 160 MPa.

Example 5

Thermal spray spherical particles having an average particle diameter of 50 μm were prepared as in Example 1 except that ytterbium oxide having a Fisher diameter of 0.30 μm was used. The particles were measured to have a breaking strength of about 120 MPa.

Comparative Example 1

Thermal spray spherical particles having an average particle diameter of 50 μm were prepared as in Example 1 except that yttrium oxide having a Fisher diameter of 1.5 μm was used. The particles were measured to have a breaking strength of about 2 MPa.

Table 1 summarizes the type and Fisher diameter of the starting powder, the firing temperature, and the average particle diameter and breaking strength of thermal spray spherical particles in the foregoing Examples and Comparative Examples.

TABLE 1

|  |  |  | Starting powder | | Spray particles | |
|---|---|---|---|---|---|---|
|  |  | Type | Fisher diameter (μm) | Firing temperature (° C.) | Average particle diameter (μM) | Breaking strength (MPa) |
| Example | 1 | yttrium oxide | 0.45 | 1600 | 50 | 13 |
|  | 2 | yttrium oxide | 0.28 | 1600 | 50 | 160 |
|  | 3 | yttrium oxide | 0.35 | 1600 | 49 | 130 |
|  | 4 | ytterbium oxide | 0.28 | 1600 | 50 | 160 |

TABLE 1-continued

|  |  | Starting powder | | Spray particles | |
|---|---|---|---|---|---|
|  |  |  |  | Average | |
|  |  | Type | Fisher diameter ($\mu$m) | Firing temperature (° C.) | particle diameter ($\mu$M) | Breaking strength (MPa) |
|  | 5 | ytterbium oxide | 0.30 | 1600 | 50 | 120 |
| Comparative Example | 1 | yttrium oxide | 1.5 | 1600 | 50 | 2 |

As seen from the results of Examples and Comparative Examples, spray spherical particles prepared using a starting oxide powder having a Fisher diameter of less than 0.6 $\mu$m had a breaking strength of more than 10 MPa and sometimes (in Examples 2–5) more than 50 MPa.

Using a plasma spraying torch, the spray particles obtained in Examples and Comparative Examples were sprayed to alumina ceramic substrates. When the spray particles having a breaking strength of more than 10 MPa in Examples were used, no fines resulting from rupture of particles developed during the spraying and good sprayed coatings were obtained.

Since the thermal spray spherical particles in the first embodiment of the invention are formed of rare earth oxide and have a breaking strength of at least 10 MPa and an average particle diameter of 10 to 80 $\mu$m according to the present invention, they do not collapse into fines in the spraying flame or plasma. By spraying the particles, there is formed a satisfactory coating having no fines stuck to its surface.

Example 6

In 12 liters of deionized water was dissolved 15 g of polyvinyl alcohol (PVA). 8 kg of yttrium oxide having a Fisher diameter of 0.5 $\mu$m and containing less than 0.5 ppm of $Fe_2O_3$ was dispersed therein to form a slurry. Using a spray granulator, the slurry was spray dried to form spherical granules. The granulated powder was fired in air at 1,600° C. for 2 hours, obtaining spherical particles for thermal spraying.

The spray particles obtained by the above procedure were measured for diameter using a laser diffraction particle size meter, finding a D90 of 45 $\mu$m. The particles had a bulk density of 1.86 g/cm$^3$, a specific surface area of 0.6 m$^2$/g as measured by the BET method, a cumulative volume of pores with a radius of up to 1 $\mu$m which was 0.18 cm$^3$/g, an average particle diameter D50/Fisher diameter ratio of 2.25, and an aspect ratio of 1.01. Note that the cumulative pore volume was measured by a mercury penetration auto-scanning porosimeter Model 33 by Yuasa Ionics K.K.

The particles were measured for impurity concentration by ICP emission spectrometry after acidolysis, finding 1 ppm of $Fe_2O_3$ and 2 ppm of CaO. On atomic-absorption spectroscopy analysis, the particles contained 5 ppm of $Na_2O$ and 70 ppm of carbon.

Using an argon/hydrogen gas plasma, the particles were sprayed to an aluminum alloy substrate (No. 6061 defined in JIS H4000) to form a coating of 190 $\mu$m thick thereon. During the spraying step, the nozzle was not clogged at all. The coating was measured for surface roughness as an indicator of smoothness, finding a Rmax of 48 $\mu$m according to JIS B0601.

For examining the denseness, the sprayed coating was measured for relative density. After the spray coated substrate was dipped in dilute hydrochloric acid, and the coating was stripped from the substrate, the relative density was measured by Archimedes method. A relative density of 92% was recorded.

Example 7

In 16 liters of deionized water was dissolved 15 g of carboxymethyl cellulose (CMC). 4 kg of ytterbium oxide having a Fisher diameter of 0.4 $\mu$m and containing less than 0.5 ppm of $Fe_2O_3$ was dispersed therein to form a slurry. Using a spray granulator, the slurry was spray dried to form spherical granules. The granulated powder was fired in air at 1,500° C. for 2 hours, obtaining spherical particles for thermal spraying.

The spray particles obtained by the above procedure were measured for diameter using a laser diffraction particle size meter, finding a D90 of 36 $\mu$m. The particles had a bulk density of 2.2 g/cm$^3$, a BET specific surface area of 0.5 m$^2$/g, a cumulative pore volume (pore radius$\leq$1 $\mu$m) of 0.04 cm$^3$/g, a D50/Fisher diameter ratio of 2.05, and an aspect ratio of 1.02.

The particles were measured for impurity concentration by ICP emission spectrometry after acidolysis, finding 1 ppm of $Fe_2O_3$ and 3 ppm of CaO. Atomic-absorption spectroscopy showed a $Na_2O$ content of 4 ppm and a carbon concentration of 60 ppm.

Using an argon/hydrogen gas plasma, the particles were sprayed to an aluminum alloy substrate to form a coating of 210 $\mu$m thick thereon. During the spraying step, the nozzle was not clogged at all. The coating was measured for surface roughness, finding a Rmax of 39 $\mu$m.

For examining the denseness, the sprayed coating was measured for relative density as in Example 6. A relative density of 90% was recorded.

Example 8

In 18 liters of deionized water was dissolved 30 g of polyethylene oxide (PEO). 2 kg of yttrium oxide having a Fisher diameter of 0.3 $\mu$m and containing less than 0.5 ppm of $Fe_2O_3$ was dispersed therein to form a slurry. Using a spray granulator, the slurry was spray dried to form spherical granules. The granulated powder was fired in air at 1,650° C. for 2 hours, obtaining spherical particles for thermal spraying.

The spray particles obtained by the above procedure were measured for diameter using a laser diffraction particle size meter, finding a D90 of 28 $\mu$m. The particles had a bulk density of 1.6 g/cm$^3$, a BET specific surface area of 0.7 m$^2$/g, a cumulative pore volume (pore radius<1 $\mu$m) of 0.04 cm$^3$/g, a D50/Fisher diameter ratio of 2.13, and an aspect ratio of 1.01.

The particles were measured for impurity concentration by ICP emission spectrometry after acidolysis, finding 3 ppm of $Fe_2O_3$ and 3 ppm of CaO. Atomic-absorption spectroscopy showed a $Na_2O$ content of 4 ppm and a carbon concentration of 60 ppm.

Using an argon/hydrogen gas plasma, the particles were vacuum sprayed to a silicon substrate to form a coating of 200 μm thick thereon. During the spraying step, the nozzle was not clogged at all. The coating was measured for surface roughness, finding a Rmax of 26 μm.

For examining the denseness, the sprayed coating was measured for relative density as in Example 6. A relative density of 91% was recorded.

Example 9

In 12 liters of deionized water was dissolved 15 g of polyvinyl alcohol (PVA). 8 kg of yttrium oxide having a Fisher diameter of 0.6 μm and containing less than 0.5 ppm of $Fe_2O_3$ was dispersed therein to form a slurry. Using a spray granulator, the slurry was spray dried to form spherical granules. The granulated powder was fired in air at 1,600° C. for 2 hours. After fines were removed by a classifier, there were obtained spherical particles for thermal spraying.

The spray particles obtained by the above procedure were measured for diameter using a laser diffraction particle size meter, finding a D90 of 39 μm, a D10 of 23 μm and a dispersion index of 0.25. The particles had an aspect ratio of 1.02, a bulk density of 1.5 g/cm$^3$, a cumulative pore volume (pore radius≦1 μm) of 0.19 cm$^3$/g, and an angle of repose of 38°.

The particles were measured for impurity concentration by ICP emission spectrometry after acidolysis, finding 1 ppm of $Fe_2O_3$ and 2 ppm of CaO. Atomic-absorption spectroscopy showed a $Na_2O$ content of 5 ppm and a carbon concentration of 70 ppm.

Using an argon/hydrogen gas plasma, the particles were sprayed to an aluminum alloy substrate to form a coating of 190 μm thick thereon. During the spraying step, the nozzle was not clogged at all.

The surface of the sprayed component was observed under an electron microscope. In the photomicrograph, the number of sticking unmelted particles of a size of less than 5 μm in a 100 μm square area was counted, finding 5 particles.

Example 10

In 16 liters of deionized water was dissolved 15 g of polyethylene oxide (PEO). 4 kg of ytterbium oxide having a Fisher diameter of 0.4 μm and containing less than 0.5 ppm of $Fe_2O_3$ was dispersed therein to form a slurry. Using a spray granulator, the slurry was spray dried to form spherical granules. The granulated powder was fired in air at 1,500° C. for 2 hours. After fines were removed by a classifier, there were obtained spherical particles for thermal spraying.

The spray particles obtained by the above procedure were measured for diameter using a laser diffraction particle size meter, finding a D90 of 37 μm, a D10 of 16 μm and a dispersion index of 0.40. The particles had an aspect ratio of 1.01, a bulk density of 1.8 g/cm$^3$, a cumulative pore volume (pore radius≦1 μm) of 0.04 cm$^3$/g, and an angle of repose of 40°.

The particles were measured for impurity concentration by ICP emission spectrometry after acidolysis, finding 1 ppm of $Fe_2O_3$ and 3 ppm of CaO. Atomic-absorption spectroscopy showed a $Na_2O$ content of 4 ppm and a carbon concentration of 70 ppm.

Using an argon/hydrogen gas plasma, the particles were sprayed to an aluminum alloy substrate to form a coating of 210 μm thick thereon. During the spraying step, the nozzle was not clogged at all.

The surface of the sprayed component was observed under an electron microscope. The number of sticking unmelted particles of a size of less than 5 μm in a 100 μm square area was 3.

Example 11

In 18 liters of deionized water was dissolved 15 g of methyl cellulose (MC). 2 kg of yttrium oxide having a Fisher diameter of 0.3 μm and containing less than 0.5 ppm of $Fe_2O_3$ was dispersed therein to form a slurry. Using a spray granulator, the slurry was spray dried to form spherical granules. The granulated powder was fired in air at 1,500° C. for 2 hours. After fines were removed by a classifier, there were obtained spherical particles for thermal spraying.

The spray particles obtained by the above procedure were measured for diameter using a laser diffraction particle size meter, finding a D90 of 34 μm, a D10 of 16 μm and a dispersion index of 0.36. The particles had an aspect ratio of 1.01, a bulk density of 2.2 g/cm$^3$, a cumulative pore volume (pore radius≦1 μm) of 0.03 cm$^3$/g, and an angle of repose of 42°.

The particles were measured for impurity concentration by ICP emission spectrometry after acidolysis, finding 3 ppm of $Fe_2O_3$ and 3 ppm of CaO. Atomic-absorption spectroscopy showed a $Na_2O$ content of 4 ppm and a carbon concentration of 50 ppm.

Using an argon/hydrogen gas plasma, the particles were sprayed to quartz substrate to form a coating of 200 μm thick thereon. During the spraying step, the nozzle was not clogged at all.

The surface of the sprayed component was observed under an electron microscope. The number of sticking unmelted particles of a size of less than 5 μm in a 100 μm square area was 2.

Example 12

In 18 liters of deionized water was dissolved 15 g of polyvinyl alcohol (PVA). 2 kg of yttrium aluminum garnet having a Fisher diameter of 0.6 μm was dispersed therein to form a slurry. Using a granulator, granules were formed from the slurry. They were dried and fired in an electric furnace at 1,500° C. for 2 hours. After fines were removed by a classifier, there were obtained spherical particles for thermal spraying.

The spray particles obtained by the above procedure were measured for diameter using a laser diffraction particle size meter, finding a D90 of 36 μm, a D10 of 15 μm and a dispersion index of 0.41. The particles had an aspect ratio of 1.06, a bulk density of 1.1 g/cm$^3$, and a cumulative pore volume (pore radius≦1 μm) of 0.3 cm$^3$/g.

The particles were measured for impurity concentration by ICP emission spectrometry after acidolysis, finding 4 ppm of $Fe_2O_3$ and 4 ppm of CaO. Atomic-absorption spectroscopy showed a $Na_2O$ content of 5 ppm and a carbon concentration of 65 ppm.

Using an argon/hydrogen gas plasma, the particles were sprayed to an aluminum alloy substrate to form a coating of 203 μm thick thereon. During the spraying step, the nozzle was not clogged at all.

The surface of the sprayed component was observed under an electron microscope. The number of sticking unmelted particles of a size of less than 5 μm in a 100 μm square area was 2.

Example 13

In 18 liters of deionized water was dissolved 15 g of polyvinyl alcohol (PVA). 2 kg of ytterbium silicate having a Fisher diameter of 0.6 μm was dispersed therein to form a slurry. Using a granulator, granules were formed from the slurry. They were dried and fired in an electric furnace at 1,500° C. for 2 hours. After fines were removed by a classifier, there were obtained spherical particles for thermal spraying.

The spray particles obtained by the above procedure were measured for diameter using a laser diffraction particle size meter, finding a D90 of 33 μm, a D10 of 14 μm and a dispersion index of 0.40. The particles had an aspect ratio of 1.1, a bulk density of 1.9 g/cm$^3$, and a cumulative pore volume (pore radius≦1 μm) of 0.28 cm$^3$/g.

The particles were measured for impurity concentration by ICP emission spectrometry after acidolysis, finding 3 ppm of $Fe_2O_3$ and 5 ppm of CaO. Atomic-absorption spectroscopy showed a $Na_2O$ content of 4 ppm and a carbon concentration of 72 ppm.

Using an argon/hydrogen gas plasma, the particles were sprayed to an aluminum alloy substrate to form a coating of 194 μm thick thereon. During the spraying step, the nozzle was not clogged at all.

The surface of the sprayed component was observed under an electron microscope. The number of sticking unmelted particles of a size of less than 5 μm in a 100 μm square area was 3.

Comparative Example 2

In 12 liters of deionized water was dissolved 15 g of polyvinyl alcohol (PVA). 8 kg of yttrium oxide having a Fisher diameter of 1.1 μm and containing less than 0.5 ppm of $Fe_2O_3$ was dispersed therein to form a slurry. Using a spray granulator, the slurry was spray dried to form spherical granules. They were fired in air at 1,600° C. for 2 hours, obtaining spherical particles for thermal spraying.

The spray particles obtained by the above procedure were measured for diameter using a laser diffraction particle size meter, finding a D90 of 106 μm. The particles had a bulk density of 1.1 g/cm$^3$, a BET specific surface area of 1.4 m$^2$/g, a cumulative pore volume (pore radius≦1 μm) of 0.55 cm$^3$/g, a D50/Fisher diameter ratio of 6.93, and an aspect ratio of 1.1.

The particles were measured for impurity concentration by ICP emission spectrometry after acidolysis, finding 3 ppm of $Fe_2O_3$ and 2 ppm of CaO. Atomic-absorption spectroscopy showed a $Na_2O$ content of 5 ppm and a carbon concentration of 80 ppm.

Using an argon/hydrogen gas plasma, the particles were sprayed to an aluminum alloy substrate to form a coating of 195 μm thick thereon. During the spraying step, the nozzle was not clogged at all. The coating was measured for surface roughness, finding a Rmax of 88 μm.

For examining the denseness, the sprayed coating was measured for relative density as in Example 6. A relative density of 84% was recorded.

Comparative Example 3

Yttrium oxide having a Fisher diameter of 4 μm, 3 kg, was melted and solidified. This was followed by grinding and classification, obtaining spherical particles for thermal spraying.

The spray particles obtained by the above procedure were measured for diameter using a laser diffraction particle size meter, finding a D90 of 110 μm. The particles had a bulk density of 2.1 g/cm$^3$, a BET specific surface area of 0.1 m$^2$/g, a cumulative pore volume (pore radius≦1 μm) of up to 0.01 cm$^3$/g, a D50/Fisher diameter ratio of 3.05, and an aspect ratio of 2.6.

The particles were measured for impurity concentration by ICP emission spectrometry after acidolysis, finding 55 ppm of $Fe_2O_3$ and 40 ppm of CaO. Atomic-absorption spectroscopy showed a $Na_2O$ content of 10 ppm and a carbon concentration of 92 ppm.

Using an argon/hydrogen gas plasma, the particles were sprayed to an aluminum alloy substrate to form a coating of 190 μm thick thereon. During the spraying step, the nozzle was not clogged at all. The coating was measured for surface roughness, finding a Rmax of 94 μm.

For examining the denseness, the sprayed coating was measured for relative density as in Example 6. A relative density of 91% was recorded.

All the spray particles of rare earth-containing oxide obtained in Examples 6–8 have a D90 of up to 100 μm in particle size distribution, a D50/Fisher diameter ratio of up to 5, a bulk density of at least 1.0 g/cm$^3$, a cumulative pore volume (pore radius≦1 μm) of less than 0.5 cm$^3$/g, and a generally spherical shape with an aspect ratio of up to 2. In addition, the impurity contents are low as demonstrated by a $Fe_2O_3$, CaO and $Na_2O$ content of each up to 5 ppm.

Using these particles, a sprayed coating of high purity is formed. The coating has a high density and a smooth surface and is strippable with difficulty. When the sprayed component is used in semiconductor manufacturing process, the generation of dust from the sprayed component is minimized. The sprayed component is advantageously used in the application where a high purity is required, for example, liquid crystal manufacturing equipment and semiconductor manufacturing equipment.

The sprayed component has a smooth coating with a surface roughness of up to 60 μm and is useful as a corrosion resistant component for operation in a corrosive gas atmosphere such as halide gas plasma.

The spray particles of rare earth-containing oxide obtained in Examples 9–13 enable precise metering despite their smaller particle diameter and have a cumulative pore volume (pore radius≦1 μm) of less than 0.5 cm$^3$/g, an aspect ratio of up to 2, a bulk density of at least 1.0 g/cm$^3$, and a particle size distribution with a D10 of at least 10 μm, a D90 of up to 100 μm, and a dispersion index of up to 0.6. In addition, they are highly pure in that the impurity contents are as low as a $Fe_2O_3$, CaO and $Na_2O$ content of each up to 5 ppm.

Using these particles, a sprayed coating of high purity is formed. Since the number of sticking unmelted particles with a size of less than 5 μm in a 100 μm square area is up to 10, the sprayed component, when used in semiconductor manufacturing process, minimizes the generation of dust therefrom. The sprayed component is advantageously used in the application where a high purity is required, for example, liquid crystal manufacturing equipment and semiconductor manufacturing equipment.

The sprayed component has a smooth coating with a reduced surface roughness and is useful as a corrosion resistant component for operation in a corrosive gas atmosphere such as halide gas plasma.

In contrast, the spray particles of Comparative Example 2 have a D90 as large as 106 μm and a D50/Fisher diameter ratio of 6.93. As a result, a coating obtained by spraying the particles has a large surface roughness and fails to suppress dust generation in the semiconductor manufacturing process.

The spray particles of Comparative Example 3 have a D50/Fisher diameter ratio as small as 3.05 and provide a coating having a high relative density. However, the iron group element, alkali metal element and alkaline earth metal element are present in the coating in the amounts corresponding to those in the spray particles. When the sprayed component is used in the semiconductor manufacturing process, these impurities can contaminate silicon wafers and become process disturbances. The sprayed component is unsuited in the semiconductor manufacturing equipment and similar application where a high purity is required.

The sprayed component has a rough coating with a surface roughness of 69 μm and allows dust to generate in the semiconductor manufacturing process, which dust undesirably causes to contaminate silicon wafers.

The thermal spray particles of rare earth-containing compound according to the second embodiment of the present invention have a bulk density of at least 1.0 g/cm$^3$, an aspect ratio of up to 2, a cumulative pore volume (pore radius≦1 μm) of less than 0.5 cm$^3$/g and a generally spherical shape. The particles are thus smoothly flowing and can be precisely fed at a constant rate to a spray nozzle without causing clogging. A coating obtained by spraying the particles is smooth and dense.

Japanese Patent Application Nos. 2001-064725 and 2001-109182 are incorporated herein by reference.

Reasonable modifications and variations are possible from the foregoing disclosure without departing from either the spirit or scope of the present invention as defined by the claims.

What is claimed is:

1. Spherical particles for thermal spraying, consisting essentially of a yttrium or lanthanide-containing compound and having a breaking strength of at least 10 MPa and an average particle diameter of 15 to 80 μm.

2. The spherical particles of claim 1, wherein said spherical particles are obtained by granulating yttrium or lanthanide-containing compound fines having a Fisher diameter of up to 0.6 μm into granules and firing said granules.

3. The spherical particles of claim 2, wherein said granules are fired at a temperature of 1500 to 1800° C.

4. The spherical particles of claim 1, having an average particle diameter of 15 to 60 μm.

5. The spherical particles of claim wherein said yttrium or lanthanide-containing compound is a yttrium or lanthanide oxide or yttrium or lanthanide compound oxide.

6. The spherical particles of claim 1, wherein said yttrium or lanthanide-containing compound is at least one selected from the group consisting of yttrium oxide and ytterbium oxide.

7. A thermal sprayed component comprising a substrate having a surface and a coating of the yttrium or lanthanide-containing compound particles of claim 1 thermally sprayed to the substrate surface.

8. Spherical particles for thermal spraying, consisting essentially of a yttrium or lanthanide-containing compound and having a bulk density of at least 1.0 g/cm$^3$, an aspect ratio of up to 2, and a cumulative volume of pores with a radius of up to 1 μm which is less than 0.5 cm$^3$/g.

9. The spherical particles of claim 8, wherein said spherical particles are obtained by granulating yttrium or lanthanide-containing compound having an average particle diameter of 0.01 to 5 μm and firing said granules.

10. The spherical particles of claim 9, wherein said granules are fired at a temperature of 1200 to 1800° C.

11. The spherical particles of claim 8 having a particle size distribution in which a particle diameter D90, D50 and D10 corresponds to 90 vol %, 50 vol % and 10 vol % accumulation, respectively, wherein D90 is up to 50 μm and the ratio of D50 to a Fisher diameter is up to 5.

12. The spherical particles of claim 11 wherein D10 is at least 10 μm, and the particles have a dispersion index of up to 0.6.

13. The spherical particles of claim 8 wherein said yttrium or lanthanide-containing compound is a yttrium or lanthanide oxide or yttrium or lanthanide compound oxide.

14. The spherical particles of claim 8, wherein said yttrium or lanthanide-containing compound is at least one selected from the group consisting of yttrium oxide and ytterbium oxide.

15. A thermal sprayed component comprising a substrate having a surface and a coating of the yttrium or lanthanide-containing compound particles of claim 8 thermally sprayed to the substrate surface.

* * * * *